(12) United States Patent
Strodtbeck

(10) Patent No.: US 6,413,319 B2
(45) Date of Patent: Jul. 2, 2002

(54) SONICATION OF MONOLAYER FILMS

(75) Inventor: Timothy A. Strodtbeck, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 09/731,499

(22) Filed: Dec. 7, 2000

Related U.S. Application Data

(62) Division of application No. 09/388,677, filed on Sep. 2, 1999, now Pat. No. 6,258,419.

(51) Int. Cl.⁷ .............................................. B05C 11/00
(52) U.S. Cl. ...................................... 118/688; 118/404
(58) Field of Search ................................ 118/402, 688, 118/403, 404; 425/224; 427/434.3, 600, 601, 430.1

(56) References Cited

U.S. PATENT DOCUMENTS

| | | |
|---|---|---|
| 4,418,641 A | 12/1983 | Nakashima et al. |
| 4,761,211 A | 8/1988 | Peterson et al. |
| 4,957,656 A | 9/1990 | Cerney et al. |
| 5,030,516 A | 7/1991 | Wehrmann et al. |
| 5,352,436 A | 10/1994 | Wheatley |
| 5,429,842 A | 7/1995 | Appel et al. |
| 5,468,429 A | 11/1995 | Li et al. |
| 5,538,667 A | 7/1996 | Hill et al. |
| 5,626,767 A | 5/1997 | Trampler et al. |
| 5,661,092 A | 8/1997 | Koberstein et al. |
| 5,711,888 A | 1/1998 | Trampler et al. |
| 5,747,117 A | 5/1998 | Rand Dannenberg |
| 5,750,258 A | 5/1998 | Sakai et al. |
| 6,068,878 A | * 5/2000 | Alwan |

OTHER PUBLICATIONS

Andre Barraud and Michael Vandevyver, "A Trough For Continuous Fabrication of Langmuir Blodgett Films", Thin Solid Films, Sep. 1982, pp. 221–225, Netherlands.

Peter A. Kralchevsky and Kuniaki Nagayama, "Capillary Forces between Colloidal Particles", Langnuir, 1994, pp. 23–36, vol. 10 No. 1.

* cited by examiner

Primary Examiner—Brenda A. Lamb
(74) Attorney, Agent, or Firm—Killworth, Gottman, Hagan & Schaeff LLP

(57) ABSTRACT

A process and apparatus for processing a monolayer film and transferring the monolayer film to a substrate are provided. In accordance with one embodiment of the present invention, a process for transferring a monolayer film to a substrate is provided comprising the steps of: (i) providing a water-based: carrier media defining an upper surface; (ii) introducing process particles on the upper surface of the carrier media, wherein the molecules are dissolved in a solvent and the particles and the solvent are insoluble in the carrier media; (iii) evaporating the solvent such that a non-cohesive monolayer film of the particles is formed on the upper surface of the carrier media; (iv) decreasing a degree of void incorporation in the monolayer film of particles by compressing a dimension of the non-cohesive film along the upper surface of the carrier media, and sonicating the carrier media to form micro-bubbles in the carrier media, wherein the compression and the sonication contribute to a decreased degree of void incorporation in the film of process particles; and (v) transferring the film of particles to a surface of the substrate. The steps of compressing and sonicating may be executed concurrently.

6 Claims, 1 Drawing Sheet

SONICATION OF MONOLAYER FILMS

CROSS REFERENCE TO RELATED APPLICATIONS

This application is a division of U.S. patent application Ser. No. 09/388,677, filed Sep. 2, 1999, now U.S. Pat. No. 6,258,419.

STATEMENT REGARDING FEDERALLY SPONSORED RESEARCH OR DEVELOPMENT

This invention was made with government support under Contract No. DABT63-97-C-0001 awarded by Advanced Research Projects Agency (ARPA). The government has certain rights in this invention.

BACKGROUND OF THE INVENTION

The present invention relates to the preparation and utilization of monolayer particulate films and, more specifically, to the utilization of monolayer films in applications such as semiconductor fabrication, photoresist processing, dielectric layering, integrated optical device fabrication, polymer science, adhesive technology, etc.

Particulate films that are on the order of one molecule or one particle thick are commonly referred to as ultrathin films, monomolecular layers, or monolayer films. Monolayer films are commonly produced from amphiphilic low molecular weight molecules, i.e., molecules that include a polar end and a non-polar or hydrophobic end. Disposed on the surface of a non-solvent, such as water, the polar ends of the molecules or particles will tend towards the water, while the nonpolar or hydrophobic ends will tend to project into the gas space above. Typically, small amounts of such amphiphilic substances are dissolved in a suitable solvent and, for example, introduced onto a water surface of sufficient size. The solution spreads across the surface of the water and, with evaporation of the solvent, the molecules form an initially noncohesive, monomolecular layer. By moving a suitable barrier, the water surface is reduced in size in a dimension along the surface of the water and the non-cohesive layer is compressed into a cohesive, monomolecular layer exhibiting order at the molecular level. When this quasi-solid state of this monomolecular layer is reached, further movement of this barrier meets with a clearly measurable resistance, which indicates that the cohesive state has been reached. Suitable substrates can then be immersed through the monomolecular layer into the water and in turn become coated with a cohesive monomolecular layer of the amphiphilic substance. The stated process can be repeated. This coating technique is known to those skilled in the art as the Langmuir-Blodgett technique.

Ultra-thin films prepared and applied using conventional Langmuir-Blodgett techniques are not however completely free from voids between the molecules or particles of the film. As a result, the ultra-thin films prepared according to the conventional Langmuir-Blodgett techniques may be unsuitable for specific thin film applications, particularly those related to the fabrication of semiconductor devices. Accordingly, the present inventor has recognized a need for an improved technique for preparing and utilizing cohesive monolayer films.

BRIEF SUMMARY OF THE INVENTION

This need is met by the present invention wherein an improved process and apparatus for processing a monolayer film and transferring the monolayer film to a substrate are provided. For the purposes of defining and describing the present invention, it is noted that a monolayer film may comprise a monolayer particulate film or a monomolecular film.

In accordance with one embodiment of the present invention, a process for transferring a monolayer film to a substrate is provided comprising the steps of: (i) providing a film of process particles and a process particle carrier media such that the film of process particles is disposed proximate an upper surface of the carrier media, and such that the film of process particles incorporates voids between the process particles; (ii) sonicating the carrier media to form micro-bubbles in the carrier media, wherein the sonication contributes to a decreased degree of void incorporation in the film of process particles; and (iii) transferring the film of process particles to a surface of the substrate. The film of process particles is preferably disposed along the upper surface of the carrier media. The step of sonicating the carrier media may additionally result in formation of the micro-bubbles at the upper surface of the carrier media. The film of process particles preferably comprises a monolayer film.

In accordance with another embodiment of the present invention, a method of processing a monolayer film is provided comprising the steps of: (i) providing a film of process particles and a process particle carrier media such that the film of process particles is disposed proximate an upper surface of the carrier media, and such that the film of process particles incorporates voids between the process particles; and (ii) sonicating the carrier media to form micro-bubbles in the carrier media, wherein the sonication contributes to a decreased degree of void incorporation in the film of process particles.

In accordance with yet another embodiment of the present invention, a process for transferring a monolayer film to a substrate is provided comprising the steps of: (i) providing a water-based carrier media defining an upper surface; (ii) introducing process particles on the upper surface of the carrier media, wherein the particles are dissolved in a solvent and the particles and the solvent are insoluble in the carrier media; (iii) evaporating the solvent such that a non-cohesive monolayer film of the particles is formed on the upper surface of the carrier media; (iv) decreasing a degree of void incorporation in the monolayer film of particles by compressing a dimension of the non-cohesive film along the upper surface of the carrier media, and sonicating the carrier media to form micro-bubbles in the carrier media, wherein the compression and the sonication contribute to a decreased degree of void incorporation in the film of process particles; and (v) transferring the film of particles to a surface of the substrate. The steps of compressing and sonicating may be executed concurrently.

In accordance with yet another embodiment of the present invention, a method of processing a monolayer film is provided comprising the steps of: (i) providing a water-based carrier media defining an upper surface; (ii) introducing process particles on the upper surface of the carrier media, wherein the particles are dissolved in a solvent and the particles and the solvent are insoluble in the carrier media; (iii) evaporating the solvent such that a non-cohesive monolayer film of the particles is formed on the upper surface of the carrier media; and (iv) decreasing a degree of void incorporation in the monolayer film of particles by compressing the non-cohesive film, and sonicating the carrier media to form micro-bubbles in the carrier media, wherein the compression and the sonication contribute to a decreased degree of void incorporation in the film of process particles.

In accordance with yet another embodiment of the present invention, a process for transferring a monolayer film to a substrate is provided comprising the steps of: (i) providing a water-based carrier media defining an upper surface; (ii) introducing process particle molecules on the upper surface of the carrier media, wherein the molecules include a polar end and a hydrophobic end, the molecules are dissolved in a solvent, and the molecules and the solvent are insoluble in the carrier media; (iii) evaporating the solvent such that a non-cohesive monolayer film of the molecules is formed on the upper surface of the carrier media; (iv) decreasing a degree of void incorporation in the monolayer film of molecules by compressing a dimension of the non-cohesive film along the upper surface of the carrier media to yield a predetermined compressed film surface tension, and by sonicating the carrier media over a predetermined sweep frequency through a sonication energy transfer bath sonically coupled to the carrier media to form micro-bubbles in the carrier media, wherein the compression and the sonication contribute to a decreased degree of void incorporation in the film of process particles; and (v) transferring the film of molecules to a surface of the substrate by drawing the substrate through the carrier media and the film of process particles, and maintaining the sonication and the compressed film surface tension as the substrate is drawn through the carrier media and the film of process particles.

In accordance with yet another embodiment of the present invention, an apparatus for transferring a monolayer film to a substrate is provided comprising a carrier bath, a compression member, at least one sonication transducer, a substrate draw, and a film surface tension controller. The carrier bath is arranged to contain a process particle carrier media such that the carrier media defines an upper surface. The compression member is arranged to compress a film of process particles disposed proximate the upper surface of the carrier media. The compression increases the film surface tension of the film of process particles. The sonication transducer is arranged to sonicate the carrier media to form micro-bubbles in the carrier media. The compression member and the sonication transducers are arranged to decrease collectively a degree of void incorporation in the film of process particles. The substrate draw is arranged to pass the substrate through the film of process particles and the film surface tension controller is arranged to maintain the film surface tension. The film surface tension controller may be arranged to maintain the film surface tension as the substrate is passed through the film of process particles and as the carrier media is sonicated.

In accordance with yet another embodiment of the present invention, an apparatus for preparing a monolayer film is provided comprising a carrier bath, a compression member, at least one sonication transducer, and a film surface tension controller. The carrier bath is arranged to contain a process particle carrier media such that the carrier media defines an upper surface. The compression member is arranged to compress a film of process particles disposed proximate the upper surface of the carrier media. The compression increases the surface tension of the film of process particles. The sonication transducer is arranged to sonicate the carrier media to form micro-bubbles in the carrier media. The compression member and the sonication transducers are arranged to decrease collectively a degree of void incorporation in the film of process particles. The film surface tension controller arranged to maintain the film surface tension.

In accordance with yet another embodiment of the present invention, an apparatus for transferring a monolayer film to a substrate is provided comprising a carrier bath, a transfer bath, a draw bath, a compression member, a film surface tension monitor, an array of sonication transducers, a substrate draw, and a film surface tension controller. The carrier bath is arranged to contain a process particle carrier media such that the carrier media defines an upper surface. The carrier media is selected such that the process particles are insoluble in the carrier med. The transfer bath is sonically coupled to the carrier bath and is arranged to contain a sonic energy transfer fluid therein. The draw bath is arranged to accommodate the substrate therein in an orientation substantially perpendicular to the upper surface of the carrier media. The compression member is arranged to compress a film of process particle molecules disposed proximate the upper surface of the carrier media, wherein the compression increases the surface tension of the film. A film surface tension monitor is arranged to measure the film surface tension. The array of sonication transducers are arranged to sonicate the carrier media over a predetermined sweep frequency through the transfer bath to form micro-bubbles in the carrier media. The compression member and the sonication transducers are arranged to decrease collectively a degree of void incorporation in the film of process particles. The substrate draw is arranged to transfer the film of process particle molecules to a surface of the substrate by drawing substrate from the draw bath through the carrier media and the film of process particles. The film surface tension controller arranged to maintain the film surface tension as the substrate is passed through the carrier media and the film of process particles.

Accordingly, it is an object of the present invention to provide an improved technique for preparing and utilizing cohesive monolayer films. Other objects of the present invention will be apparent in light of the description of the invention embodied herein.

BRIEF DESCRIPTION OF THE DRAWING

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
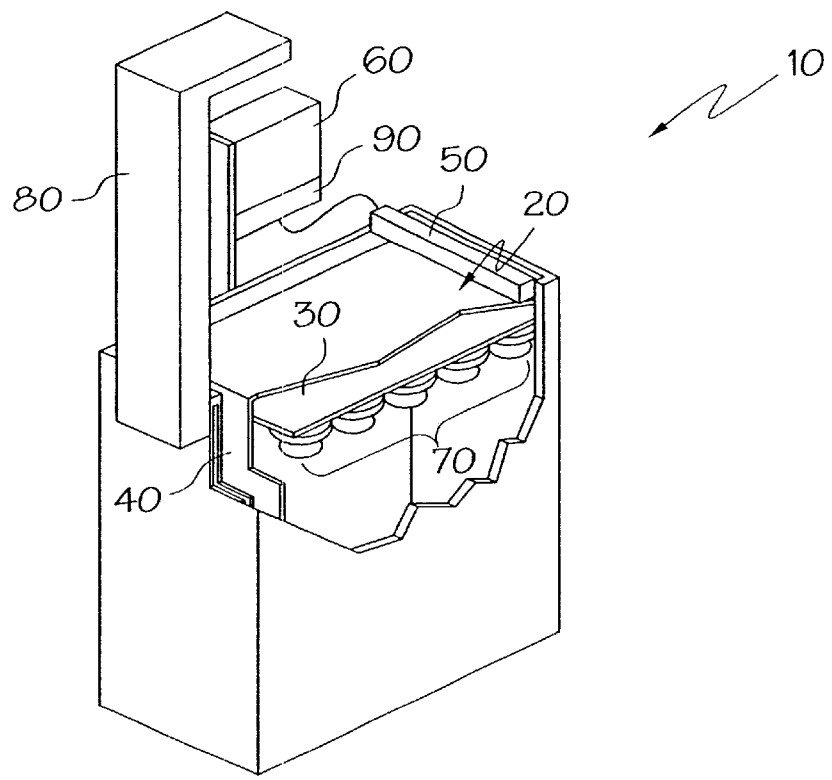
FIG. 1 is a three dimensional illustration of a process and apparatus for preparing an monolayer film and transferring the monolayer film to a substrate.
Figure 2:
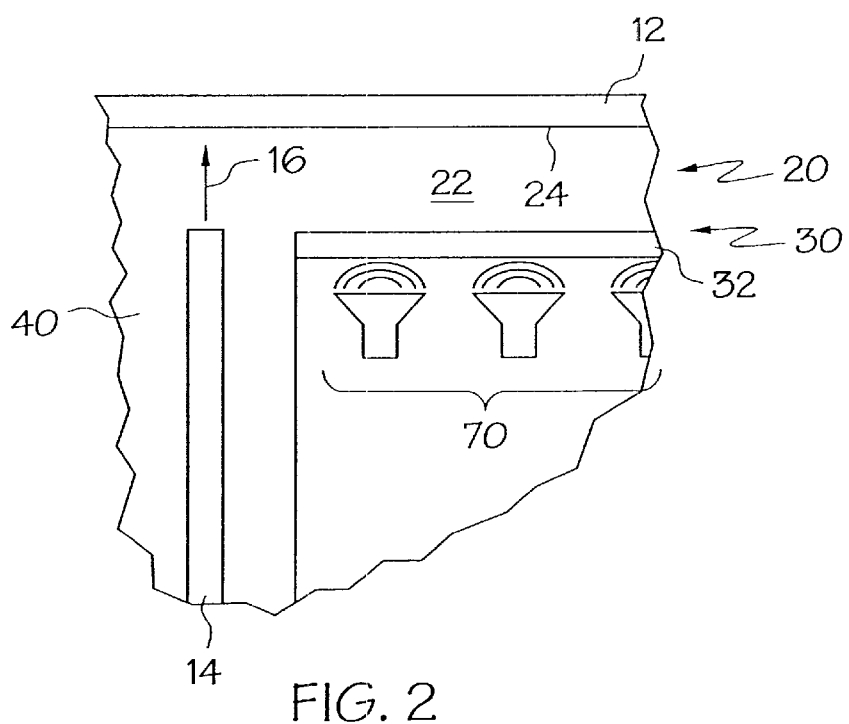
FIG. 2 is a schematic illustration of the manner in which a monolayer film processed according to the present invention may be transferred to a substrate.

A film transfer apparatus 10 according to the present invention is illustrated in FIGS. 1 and 2. The apparatus 10 is arranged to transfer a monolayer film 12 to a substrate 14 and comprises a carrier bath 20, a transfer bath 30, a draw bath 40, a compression member 50, a film surface tension monitor 60, an array of sonication transducers 70, a substrate draw 80, and a film surface tension controller 90.

The carrier bath 20 is arranged to contain a process particle carrier media 22 defining an upper surface 24 upon which the monolayer film 12 is introduced. The monolayer film 12 includes process particles to be transferred to the substrate 14. Typically, the process particles are dissolved in a suitable solvent prior to their introduction to the upper surface 24. The process particles may comprise, for example, latex spheres and the solvent may comprise, for example, methanol. The carrier media 22 may comprise, for example, de-ionized water or another fluid in which process particles are not soluble. Of course, it is contemplated by the present invention that a variety of process particles, solvents, and carrier media may be employed in the process and apparatus of the present invention. The carrier bath 20 may be constructed from any material that is hydrophobic like Teflon or Teflon-coated aluminum.

The array of sonication transducers 70 are arranged to sonicate the carrier media 22 through the transfer bath 30 to form micro-bubbles in the carrier media 22. To this end, the transfer bath 30 is sonically coupled to the carrier bath and is arranged to contain a sonic energy transfer fluid 32, e.g., de-ionized water. The frequency of sonication is partially dependent upon the size of the process particles. Preferably, the carrier media is sonicated over a predetermined sweep frequency to minimize the creation of standing waves at the upper surface 24 of the carrier media 22.

The compression member 50 is arranged to compress the film of process particles 12 disposed proximate the upper surface 24 of the carrier media 22 and increase the film surface tension of the film of process particles 12. The film surface tension monitor 60 is arranged to measure the film surface tension. The film surface tension controller 90 completes a feedback loop from the tension monitor 60 to the compression member and is arranged to maintain the film surface tension at a suitable value. The above-described sonication and compression are performed together to decrease collectively a degree of void incorporation in the film of process particles 12.

The draw bath 40 is arranged to accommodate the substrate 14 therein in an orientation substantially perpendicular to the upper surface 24 of the carrier media 22. The substrate draw 80 is arranged to transfer the film of process particles 12 to a surface of the substrate 14 by drawing the substrate 14 from the draw bath 40 through the carrier media 20 and the film of process particles 12, as indicated by directional arrow 16. The film surface tension controller 90 is further arranged to maintain the film surface tension as the substrate 14 is passed through the carrier media 22 and the film of process particles 12.

Initially, according to the process of the present invention, a suitable carrier media 22, e.g. a water-based carrier media, is provided in the carrier bath 20. Process particles are introduced on the upper surface 24 of the carrier media 22. The particles may comprise single molecules that include a polar end that will tend towards the water-based carrier media and a hydrophobic end that will tend towards the space above the upper surface 24. The process particles are dissolved in a solvent to make it easier to introduce them to the upper surface 24 of the carrier media 22. The carrier media, the particles, and the solvent are selected such that the particles and solvent are insoluble in the carrier media. The solvent is then evaporated on the surface of the carrier media 22 such that a non-cohesive monolayer film of process particles 12 is formed on the upper surface 24 of the carrier media 22. The film is described herein as non-cohesive because it includes a certain number of voids or spaces formed between adjacent process particles.

The degree of void incorporation in the monolayer film of particles 12 is decreased according to the present invention through compression of the monolayer film 12 and sonication of the carrier media 22. Specifically, the non-cohesive film 12 is compressed by the compression member or bar 50 along the upper surface 24 of the carrier media 24. The compression member 50, the film surface tension monitor 60, and the film surface tension controller 90 are operated in a feedback loop to enable maintenance of a predetermined compressed film surface tension. The carrier media 22 is sonicated at a predetermined frequency, e.g., 30 kHz, or over a predetermined sweep frequency, e.g., 28.5 kHz to 31.5 kHz, to form micro-bubbles in the carrier media 22. The micro-bubbles help to relieve the surface tension of particles and allow them to move into a more closely aligned structure, as encouraged by the action of the compression member 50. Accordingly, the compression and the sonication contribute to a decreased degree of void incorporation in the film of process particles 12. In the illustrated embodiment, the carrier media 22 is sonicated through the sonication energy transfer bath 30 sonically coupled to the carrier media 22.

The film of process particles 12 is transferred to a surface of the substrate 14 by drawing the substrate 14 through the carrier media 22 and the film of process particles 12, as is indicated by the directional arrow 16 in FIG. 2. The sonication and the compressed film surface tension are maintained as the substrate 14 is drawn through the carrier media 22 and the film of process particles 12.

Having described the invention in detail and by reference to preferred embodiments thereof, it will be apparent that modifications and variations are possible without departing from the scope of the invention defined in the appended claims.

What is claimed is:

1. An apparatus for transferring a monolayer film to a substrate comprising:
    a carrier bath arranged to contain a process particle carrier media such that said carrier media defines an upper surface;
    a draw bath in fluid communication with said carrier bath;
    a compression member arranged to compress a film of process particles disposed proximate said upper surface of said carrier media, wherein said compression increases a film surface tension of said film of process particles;
    at least one sonication transducer arranged to sonicate said carrier media to form micro-bubbles in said carder media, wherein said compression member and said sonication transducers are arranged to decrease collectively a degree of void incorporation in said film of process particles; and
    a substrate draw arranged to position said substrate within said draw bath beneath said upper surface of said carrier media and to pass said substrate through said film of process particles from below said upper surface of said carrier media.

2. An apparatus for transferring a monolayer film to a substrate comprising:
    a carrier bath arranged to contain a process particle carrier media such that said carrier media defines an upper surface;
    a compression member arranged to compress a film of process particles disposed proximate said upper surface of said carrier media, wherein said compression increases a film surface tension of said film of process particles;
    at least one sonication transducer arranged to sonicate said carrier media to form micro-bubbles in said carrier media, wherein said compression member and said sonication transducers are arranged to decrease collectively a degree of void incorporation in said film of process particles; and a substrate draw arranged to pass said substrate through said film of process particles;

a film surface tension monitor arranged to measure said film surface tension of said film of process particles;

a film surface tension controller arranged to complete a feedback loop from said film surface tension monitor to said compression member and to maintain said film surface tension at a suitable value, wherein said film surface tension controller is arranged to maintain said film surface tension as said substrate is passed through said film of process particles.

3. An apparatus for transferring a monolayer film to a substrate comprising:

a carrier bath arranged to contain a process particle carrier media such that said carrier media defines an upper surface;

a compression member arranged to compress a film of process particles disposed proximate said upper surface of said carrier media, wherein said compression increases a film surface tension of said film of process particles;

at least one sonication transducer arranged to sonicate said carrier media to form micro-bubbles in said carrier media, wherein said compression member and said sonication transducers are arranged to decrease collectively a degree of void incorporation in said film of process particles; and a substrate draw arranged to pass said substrate through said film of process particles;

a film surface tension monitor arranged to measure said film surface tension of said film of process particles;

a film surface tension controller arranged to complete a feedback loop from said film surface tension monitor to said compression member and to maintain said film surface tension at a suitable value, wherein said film surface tension controller is arranged to maintain said film surface tension as said carrier media is sonicated.

4. An apparatus for preparing a monolayer film:

a carrier bath arranged to contain a process particle carrier media such that said carrier media defines an upper surface;

a compression member arranged to compress a film of process particles disposed proximate said upper surface of said carrier media, wherein said compression increases a film surface tension of said film of process particles;

at least one sonication transducer arranged to sonicate said carrier media over a predetermined sweep frequency to form micro-bubbles in said carrier media, wherein said compression member and said sonication transducers are arranged to decrease collectively a degree of void incorporation in said film of process particles and wherein said sweep frequency is selected to minimize creation of standing waves at said upper surface of said carrier media.

5. An apparatus for transferring a monolayer film to a substrate comprising:

a carder bath arranged to contain a process particle carrier media such that said carrier media defines an upper surface, wherein said carrier media is selected such that said process particles are insoluble in said carrier media;

a draw bath in fluid communication with said carrier bath;

a transfer bath sonically coupled to said carder bath and arranged to contain a sonic energy transfer fluid therein;

a draw bath arranged to accommodate said substrate therein in an orientation substantially perpendicular to said upper surface of said carrier media;

a compression member arranged to compress a film of process particle molecules disposed proximate said upper surface of said carrier media, wherein said compression increases a film surface tension of said film of process particles;

a film surface tension monitor arranged to measure said film surface tension;

an array of sonication transducers arranged to sonicate said carrier media over a predetermined sweep frequency through said transfer bath to form micro-bubbles in said carrier media, wherein said compression member and said sonication transducers are arranged to decrease collectively a degree of void incorporation in said film of process particles, and wherein said sweep frequency is selected to minimize creation of standing waves at said upper surface of said carrier media;

a substrate draw arranged to transfer said film of process particle molecules to a surface of said substrate by positioning said substrate within said draw bath beneath said upper surface of said carrier media and drawing said substrate from said draw bath through said carrier media and said film of process particles from below said upper surface of said carrier media; and a film surface tension controller arranged to maintain said film surface tension as said substrate is passed through said carrier media and said film of process particles and as said carrier media is sonicated.

6. An apparatus for preparing a monolayer film:

a carrier bath arranged to contain a process particle carrier media such that said carrier media defines an upper surface;

a compression member arranged to compress a film of process particles disposed proximate said upper surface of said carrier media, wherein said compression increases a film surface tension of said film of process particles;

at least one sonication transducer arranged to sonicate said carrier media to form micro-bubbles in said carrier media, wherein said compression member and said sonication transducers are arranged to decrease collectively a degree of void incorporation in said film of process particles;

a film surface tension monitor arranged to measure said film surface tension of said film of process particles; and a film surface tension controller arranged to complete a feedback loop from said film surface tension monitor to said compression member and to maintain said film surface tension at a suitable value as said carrier media is sonicated.

* * * * *

UNITED STATES PATENT AND TRADEMARK OFFICE
CERTIFICATE OF CORRECTION

PATENT NO.    : 6,413,319 B2
DATED         : July 2, 2002
INVENTOR(S)   : Timothy A. Strodtbeck It is certified that error appears in the above-identified patent and that said Letters Patent is hereby corrected as shown below:

Column 2,
Lines 7 and 54, "the steps of." should be -- the steps of: --

Column 6,
Line 41, "said carder media" should be -- said carrier media --.

Column 7,
Line 60, "said carder bath" should be -- said carrier bath --.

Column 8,
Line 2, "said carder bath" should be -- said carrier bath --.

Signed and Sealed this

Fourth Day of January, 2003

JAMES E. ROGAN
*Director of the United States Patent and Trademark Office*